Figure 1:
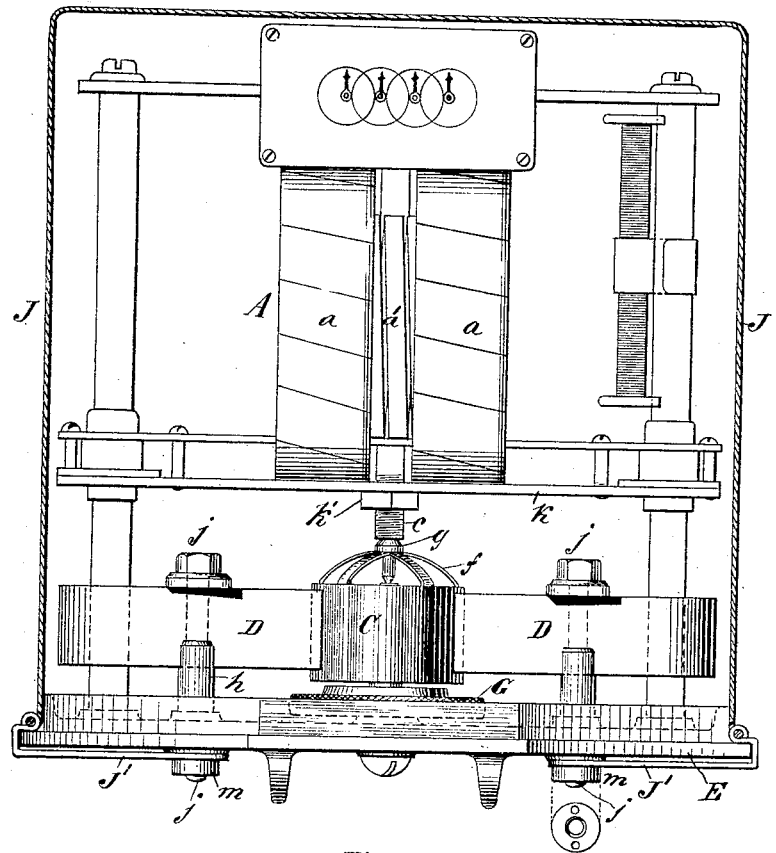

(No Model.) 2 Sheets—Sheet 1.

J. J. WOOD.
ELECTRIC METER.

No. 469,800. Patented Mar. 1, 1892.

WITNESSES:
Fred White
John Becker

INVENTOR:
James J. Wood,
By his Attorneys,
Arthur C. Fraser & Co.

(No Model.) 2 Sheets—Sheet 2.

J. J. WOOD.
ELECTRIC METER.

No. 469,800. Patented Mar. 1, 1892.

WITNESSES:
John Becker
Fred White

INVENTOR
James J. Wood,
BY
Arthur C. Fraser & Co.
ATTORNEYS.

UNITED STATES PATENT OFFICE.

JAMES J. WOOD, OF FORT WAYNE, INDIANA.

ELECTRIC METER.

SPECIFICATION forming part of Letters Patent No. 469,800, dated March 1, 1892.

Application filed October 27, 1891. Serial No. 409,944. (No model.)

*To all whom it may concern:*

Be it known that I, JAMES J. WOOD, a citizen of the United States, residing in Fort Wayne, in the county of Allen and State of Indiana, have invented certain new and useful Improvements in Electric Meters, of which the following is a specification.

This invention relates to meters for measuring electric energy.

It relates to that class of meters consisting of an electromotor driven by the current to be measured and a retarding device constituting a load or resistance for such motor and adapted to reduce the speed thereof to a direct proportion with the variations in the volume of current by which the motor is driven in order that the speed of the motor shall vary in direct proportion to the variations in the current. Various retarding devices have been proposed for this purpose, among others revolving fans and magnetic brakes. Of the latter the form most successful heretofore has been that operating on the principle of the Faraday disk dynamo. An electric meter having a retarding device operating upon this principle is shown in the patent of Elihu Thomson, No. 448,894, dated March 24, 1891. I believe the construction therein shown to be typical of the state of the art in this respect prior to my present invention, which constitutes an improvement in electric meters having retarding devices of this general type. In the meter shown in said patent and in other meters employing similar magnetic retarders the retarding device consists of a copper disk fixed on the spindle of the meter, which carries the motor-armature and revolving between the poles of one or more permanent magnets, these magnets being adjustable toward or from the center of the disk in order to vary their retarding action upon it. Meters constructed upon this principle have many features of superiority and are among the best commercial meters thus far introduced; but they are subject to certain practical difficulties which it is the object of my invention to remedy. One difficulty is that the rate at which the meter records is not entirely proportionate to the rate of current-flow, varying therefrom in a small percentage and in an irregular ratio. For example, a meter will under-register from the minimum number of lights up to a certain number, and thereafter it will gradually over-register, first in increasing and then in decreasing proportion, until a certain higher number of lights is in use, after which it will again under-register to a slight extent. By very careful adjustment the variations by over and under registry may be reduced to a small percentage; but they still remain sufficient to afford some cause for disagreement between producers and consumers of electric energy. A further difficulty is that the retarding-magnets, being permanent magnets and having no keepers, gradually lose their magnetism, so that the action of the retarder becomes gradually weaker as long as the meter continues in use, thereby causing the meter to give in course of time an incorrect registry, the percentage of error in which becomes a continually-increasing quantity. Further, the adjustment of a meter of this type is a matter of considerable difficulty. It is also very difficult to pack a meter of this type for transportation so that it may travel safely, since its construction is necessarily extremely delicate. Furthermore, it requires to be set exactly level in order to run correctly, the slightest deviation of position impairing its accuracy.

According to my invention the magnetic retarder is entirely reconstructed. I have abandoned the use of a copper disk revolving between the poles of horseshoe-magnets and have substituted therefor a cylinder of copper or other metal mounted upon the spindle of the meter and revolving in inductive proximity to the poles of horseshoe-magnets, which are arranged externally to it with their poles facing it, their arrangement being such that each portion of the surface of the cylinder encounters the poles of each magnet successively. The magnets are adjustable bodily toward and from the cylinder, thereby affording a convenient and accurate means of regulating the retarding effect. By the employment of a cylinder in lieu of a disk all portions thereof travel through the magnetic fields of force at a uniform speed, whereas with a disk those portions traveling in different circumferential paths travel at different speeds. By arranging only the polar ends of the magnets to act upon the cylinder the fields of force through which the cylinder turns are of uniform density, whereas in the case of a disk turning between the legs of horseshoe-magnets, each magnet presents an extended area of magnetic field of gradually-varying density. By reason of these circumstances the disk-retarder induces eddy or Foucault currents and there is considerable leakage of lines of force around the disk, both of which difficulties my construction avoids. The revolving cylinder is made hollow and within it is placed a solid cylindrical block or keeper of iron mounted so as to be stationary and serving as a means for closing the magnetic circuits of the retarding-magnets. This keeper, the employment of which has been impossible with the disk arrangement, constitutes a feature of great importance in my improved meter, since it insures the preservation of the intensity of the magnetism of the retarding-magnets and consequently causes the meter on being once correctly adjusted to retain thereafter its capacity for correct measurement, since the retarding action remains unchanged.

In order that the meter shall be unaffected by any slight changes of position, thereby avoiding the necessity for leveling it accurately when setting it up, I arrange the pivot or step-socket in which the lower end of the meter-spindle turns, at or closely adjacent to the center of gravity of the spindle and its attached parts—namely, the armature and retarding-cylinder; or, in other words, I mount the retarding-cylinder below the lower pivotal socket of the spindle, so that its weight (which is considerably greater than that of the armature carried by the upper part of the spindle) shall nearly or quite counterbalance the weight of the spindle and armature. Hence the spindle will revolve with equal freedom even if deflected several degrees from the vertical. By this means the necessity for employing a jeweled pivot for the upper end of the spindle is also avoided. I mount the jeweled pivot or step-socket in which the lower end of the spindle turns on the iron keeper, bringing it to about the level of the top of the retarder-cylinder. In order to provide for safely carrying or shipping the meter, I provide means for conveniently lifting the spindle and cylinder sufficiently to bring the pivotal end of the spindle out of contact with the jewel and clamping it fast against a fixed abutment, so that it may be carried or shipped without danger of breaking the jewel or otherwise injuring the delicate movable parts of the meter and without impairing its adjustment. On setting up the meter it is only necessary by turning the nut or milled disk to lower the spindle again to its normal position, thereby restoring it to working condition.

The meter embodying these improvements has been found by practical use to give a registry which varies in so nearly exact ratio with the variations of current that the margin of error is reduced to so low a percentage as to be unappreciable for practical use. As applied to incandescent electric lighting my improved meter under-registers from seven to ten per cent. when only one lamp is burning; but with two lamps its registry is correct, and it continues correct up to its total capacity (as thus far constructed) of one hundred lamps. I have adopted the speed ratio of two revolutions per minute to each lamp in use. The correct adjustment of the meter is rendered very easy, and when once correctly adjusted it retains its adjustment and continues permanently to give a correct registry.

Figure 2:
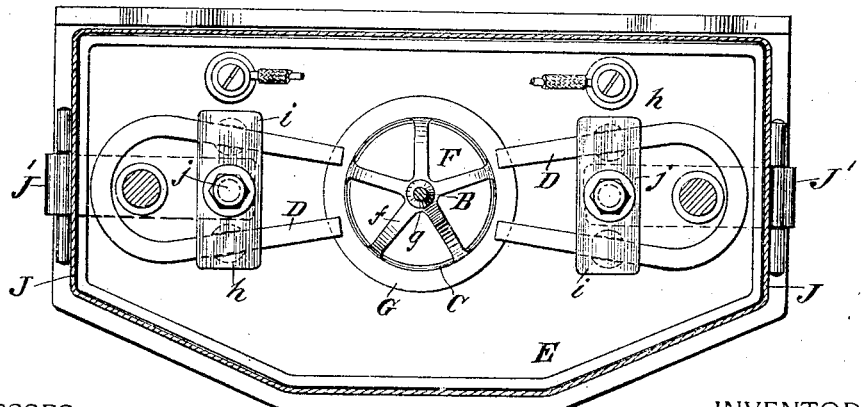
Figure 3:
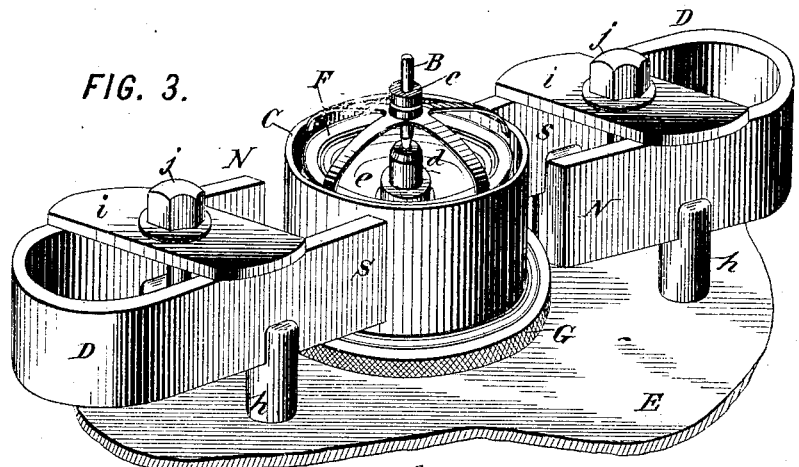
Figure 4:
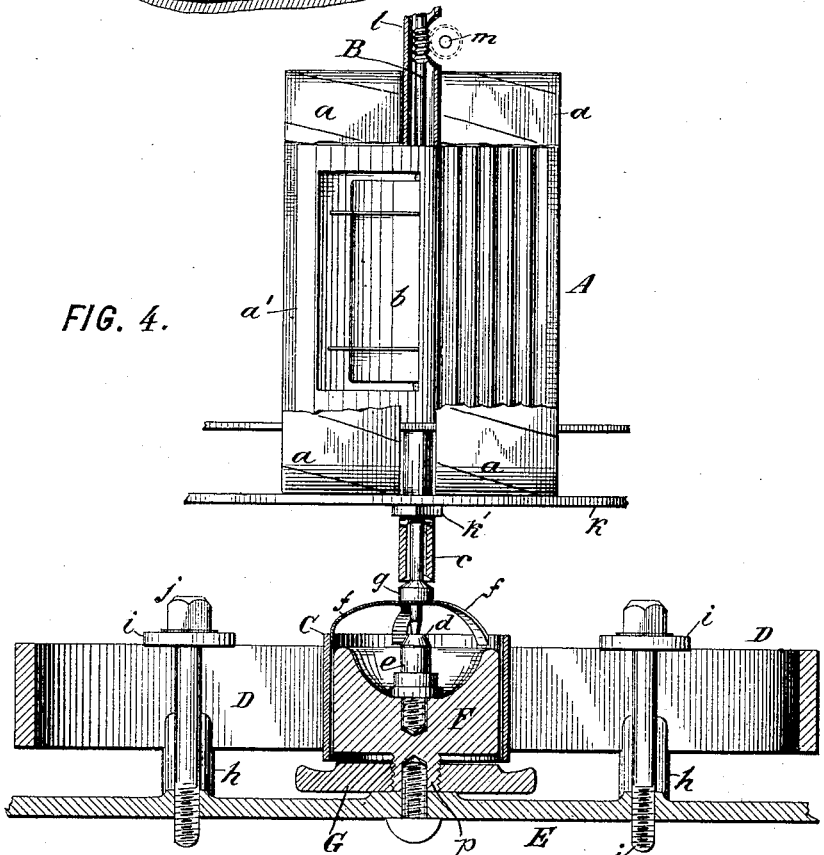

Figure 1 of the accompanying drawings is a front elevation of my improved meter with the inclosing case thereof in section. Fig. 2 is a plan of the magnetic retarder thereof. Fig. 3 is a perspective view of the retarder. Fig. 4 is a vertical section of the meter, omitting the frame-work and register or counter and showing the retarder in vertical mid-section.

Referring to the drawings, A designates an alternating-current motor of any suitable or usual construction, $a\ a'$ being the field-coils, and $b$ the armature. In lieu of this motor any suitable continuous-current motor or any kind or type of electromotor suitable for use with an electric meter may be employed. The armature of the motor is mounted on a vertical spindle B, guided at its upper end in any suitable bearing, (not shown,) with its lower portion passing freely through a tubular boss $c$, and with its lower end, which is pointed, turning in a jeweled step-socket $d$. This socket is mounted on a post or other support $e$.

To the lower portion of the spindle B is connected the revolving cylinder C of the retarder. This cylinder is preferably a copper tube and is connected to the spindle through the medium of arms $f f$, radiating from a hub $g$, fixed on the spindle and connected to the upper end of the cylinder. The cylinder is thus mounted below the pivot $d$, and its weight is such that it nearly counterbalances the weight of the parts carried by the upper part of the spindle. At either side of the cylinder are arranged two or more permanent magnets D D, of horseshoe form, having their polar ends arranged in inductive proximity to the surface of the cylinder. The magnets are constructed, preferably, of flat bar-iron arranged vertically edgewise, so that their poles occupy vertical planes, and the fields of force intersect the copper cylinder in vertical lines extending nearly from top to bottom of the cylinder. Preferably two magnets are employed, so as to balance each other on opposite sides of the cylinder, although a greater or less number of magnets may be provided. The poles of the magnets may be arranged in alternation—that is to say, so that each portion of the surface of the cylinder encounters in its revolution poles of alternately-contrary polarities—as indicated by the letters NS NS in Fig. 3; or they may be arranged thus: NS SN. The magnets are most simply and conveniently mounted by being let into notches formed in non-magnetic posts h h, with which they are held in engagement by being tightly forced down by clamps consisting of a cross-plate i and a screw or bolt j, passing through it and screwing into the base-plate E.

To strengthen the magnetic action and preserve the magnetism of the retarding-magnets, an iron keeper F is placed within the cylinder C, so that it serves to complete the magnetic circuits of the retarding-magnets. This keeper consists of an iron cylinder fixed to the base-plate E so as to be stationary and of sufficiently smaller diameter than the interior of the cylinder C to enable the latter to freely revolve exterior to it and without touching it. The step-socket post e is mounted on the keeper.

In order to adjust the retarder, it is only necessary to loosen the screws j j and move the magnets D D farther from or nearer to the cylinders C until the desired result is attained, whereupon the magnets are clamped fast by screwing down the screws j j. Adjusting-screws might be provided for imparting the endwise movements to the magnets; but this is a refinement that I have not found practically necessary.

By reason of the cylindrical form of the armature C of the retarder the latter is capable of being vertically displaced in order to lift the lower pivot of the spindle out of its step-socket d, as is necessary to enable the meter to be carried from place to place or packed for shipment, as otherwise the jeweled socket would be apt to be broken. To provide for thus lifting the pivot out of the socket and for clamping the spindle firmly in place, I arrange a nut G, turning on the threaded shank or stem P of the keeper F, so that by screwing it up tight against the under side of the cylinder C it lifts the latter, and consequently, through the arms f f, it lifts also the spindle B until its pivotal end is lifted clear of the socket. In so doing the hub g is pressed up into firm engagement with the lower end of the boss c, while the bottom of the cylinder C is firmly held and supported by the nut G. The boss c thus constitutes a fixed abutment, which is just above the upper end of the hub g, which thus constitutes a shoulder on the spindle, which is clamped against said abutment by the lifting of the spindle. In this condition the meter may be safely carried about, and by proper packing it may be safely shipped. On being set up, it is only necessary to screw down the nut G until it is pressed firmly against the base-plate E, whereby the spindle B and cylinder C are lowered, the pivot of the spindle being restored to engagement with the step-socket. The meter is then ready for immediate use and requires no further adjustment or inspection.

I have not deemed it necessary to illustrate the registering mechanism, as this forms no part of my invention and may be of any known construction. I have shown the spindle B provided with a worm l, driving a worm-wheel m, from which the register is driven.

The rotary armature or cylinder C may be of greater or less thickness, and might possibly even be made solid if the keeper F were to be omitted. Its shape may be varied greatly—as, for example, by making it spherical or more or less conical. Such changes as these and other modifications of mechanical construction of which my invention is susceptible I should regard as mere colorable evasions thereof, being included within the spirit and scope of my invention.

It will be understood that by the word "cylinder" I do not mean to be limited to the rotary element or armature of the retarder being necessarily of exactly cylindrical shape, any equivalent of such shape being admissible.

The entire meter is inclosed in a case J, which may be made of sheet metal and which slips down over the meter and at its bottom fits against the flanged bottom of the base-plate E. To the opposite sides of the case are hinged wings or hasps J', which may be turned up beneath the base-plate E and are perforated at their ends to receive the projecting ends of the screws j. On these screws are screwed nuts m m, which are of such form that they require a special wrench or key to turn them, thereby insuring that the meter shall not be opened except by an authorized person provided with such wrench.

The projecting boss c is made vertically adjustable in the plate k by screwing it through a hole therein and setting it in place by a nut k'. This adjustability is for the purpose of bringing its coned lower end into the proper position to limit the lift of the spindle when elevated by the screwing up of the nut G.

I claim as my invention the following-defined novel features or improvements, substantially as hereinbefore specified, namely:

1. In an electric meter, the combination, with an electromotor driven by the current to be measured, of a magnetic retarder therefor consisting of a conducting-cylinder revolving in inductive proximity to magnetic poles approaching it exteriorly.

2. In an electric meter, the combination, with an electromotor driven by the current to be measured, of a magnetic retarder therefor consisting of a conducting-cylinder revolved by said motor and a horseshoe-magnet exterior to said cylinder arranged with its poles facing it in positions at different radial angles, whereby the cylinder in revolving before said poles passes them successively.

3. In an electric meter, the combination, with an electromotor driven by the current to be measured, of a magnetic retarder therefor consisting of a hollow conducting-cylinder revolved by said motor, an iron keeper within said cylinder, and magnetic poles approaching said cylinder exteriorly and adjustable toward or from it to vary the magnetic retardation.

4. In an electric meter, the combination, with an electromotor driven by the current to be measured, of a magnetic retarder therefor consisting of a conducting-cylinder revolved by said motor, an iron keeper within said cylinder, and a plurality of horseshoe-magnets arranged exterior to said cylinder with their poles in inductive proximity to it and disposed symmetrically around it to balance the retardation.

5. In an electric meter, the combination, with an electromotor driven by the current to be measured, of a magnetic retarder therefor consisting of a conducting-cylinder revolved by said motor and a horseshoe-magnet exterior to said cylinder arranged with its poles facing it and adjustable toward and from the cylinder to vary the strength of the magnetic field and thereby to adjust the degree of retardation.

6. In an electric meter, the combination, with an electromotor driven by the current to be measured, of a magnetic retarder therefor consisting of a conducting-cylinder revolved by said motor, a horseshoe-magnet exterior to said cylinder arranged with its poles facing it, and a mounting for said magnet, consisting of a clamp by loosening which the magnet may be adjusted toward and from the cylinder.

7. In an electric meter, the combination, with an electromotor, of a vertical spindle on which the armature thereof is mounted, a step-socket in which the lower end of said spindle is pivoted, and a magnetic retarder consisting of a conducting-cylinder revolving in inductive proximity to the poles of a magnet and mounted on said spindle beneath the pivotal lower end thereof, whereby its weight tends to counterbalance the weight carried by the upper part of the spindle.

8. In an electric meter, the combination, with an electromotor, of a vertical spindle on which the armature thereof is mounted, a step-socket in which the lower end of said spindle is pivoted, a magnetic retarder engaging said spindle, a shoulder on said spindle, a fixed abutment just above said shoulder, and means for forcibly lifting the spindle to force its shoulder against said abutment and thereby clamp it in place with its pivotal end out of said socket, whereby it may be safely carried or packed for transportation.

9. In an electric meter, the combination, with an electromotor, of a vertical spindle on which the armature thereof is mounted, a step-socket in which the lower end of said spindle is pivoted, a magnetic retarder consisting of a conducting-cylinder carried by said spindle and revolving in inductive proximity to the poles of a magnet, and means for forcibly lifting the spindle, consisting of a nut adapted to screw up or down and on being screwed up to engage said cylinder and lift it and the spindle, thereby elevating the pivotal end of the latter out of its socket and clamping it in place, whereby the instrument may be safely carried or packed for transportation.

10. In an electric meter, the combination, with an electromotor, of a spindle B, on which the armature thereof is mounted, a magnetic retarder consisting of a cylinder C, connected to the lower part of the said spindle and magnets D D, a keeper F within said cylinder, having a screw-threaded neck $k$ and supporting the step-socket $d$, in which the lower end of said spindle is pivoted, and a device for lifting the spindle to raise its pivot out of said socket, consisting of a nut G, turning on said threaded neck and adapted when screwed up to engage and lift said cylinder.

11. In an electric meter, the combination, with an electromotor, of a spindle B, on which the armature thereof is mounted, a magnetic retarder connected to the lower part of said spindle, a step-socket $d$, in which the lower end of said spindle is pivoted, a fixed boss $c$, through which the spindle passes, a hub $g$ on the spindle beneath said boss, and a rotative nut adapted when screwed up to lift the spindle and clamp it against said boss with its lower pivotal end out of contact with said socket.

12. The combination, with an electric meter having a base-plate E and screws $j\,j$, with their threaded ends protruding below said base-plate, of an inclosing case J, mounted to fit at its bottom against said base-plate and having pivoted hasps J' J' adapted to turn under said base-plate and engage said screws, and nuts $m\,m$, screwing on said screws to confine said hasps.

In witness whereof I have hereunto signed my name in the presence of two subscribing witnesses.

JAMES J. WOOD.

Witnesses:
 ARTHUR C. FRASER,
 GEORGE H. FRASER.